Sept. 28, 1937.   R. V. PROCTOR   2,094,466
HYDRAULIC SYSTEM FOR VEHICLES
Filed May 18, 1932   6 Sheets-Sheet 2
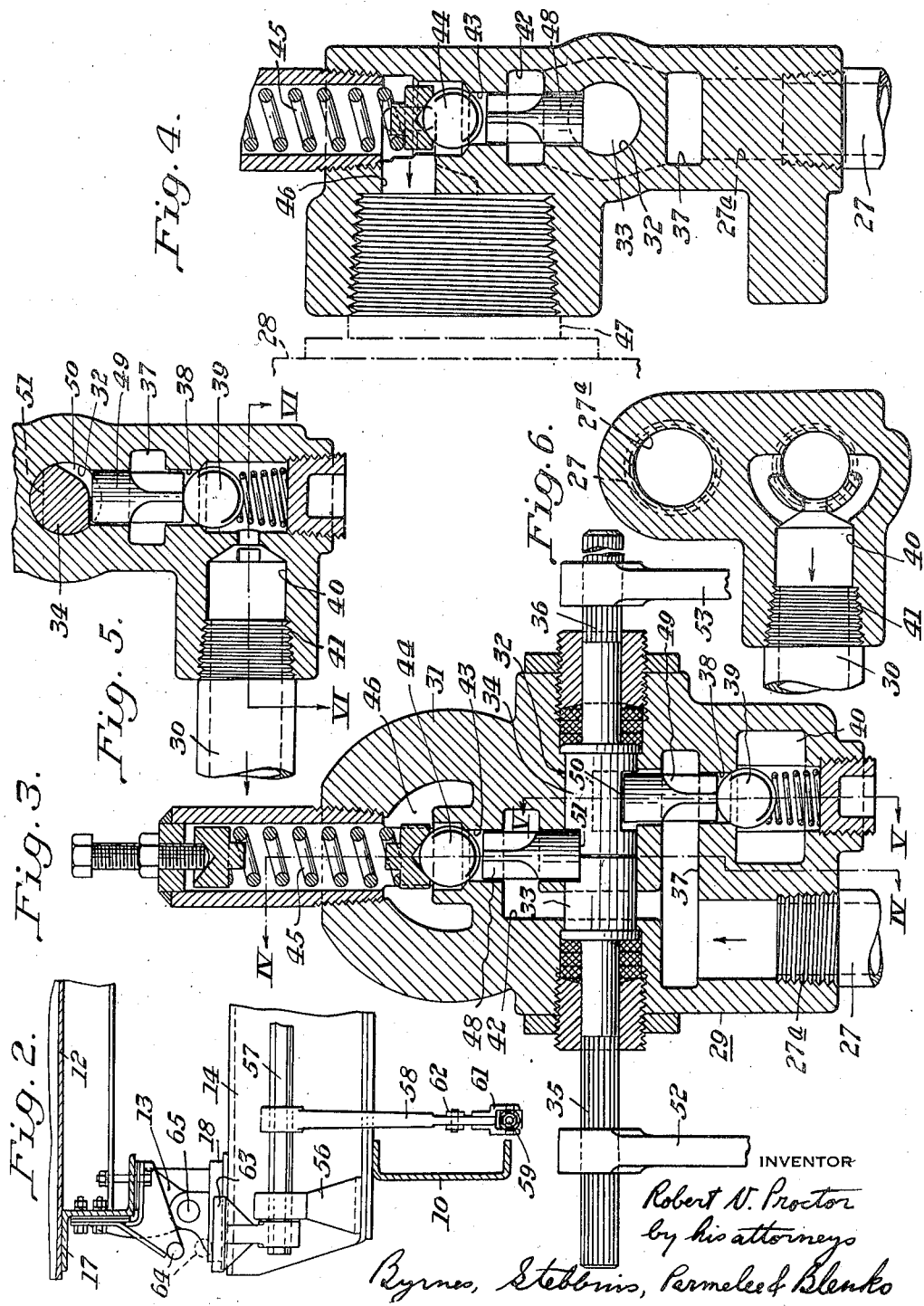
INVENTOR
Robert V. Proctor
by his attorneys
Byrnes, Stebbins, Parmelee & Blenko Sept. 28, 1937.  R. V. PROCTOR  2,094,466
HYDRAULIC SYSTEM FOR VEHICLES
Filed May 18, 1932  6 Sheets-Sheet 3
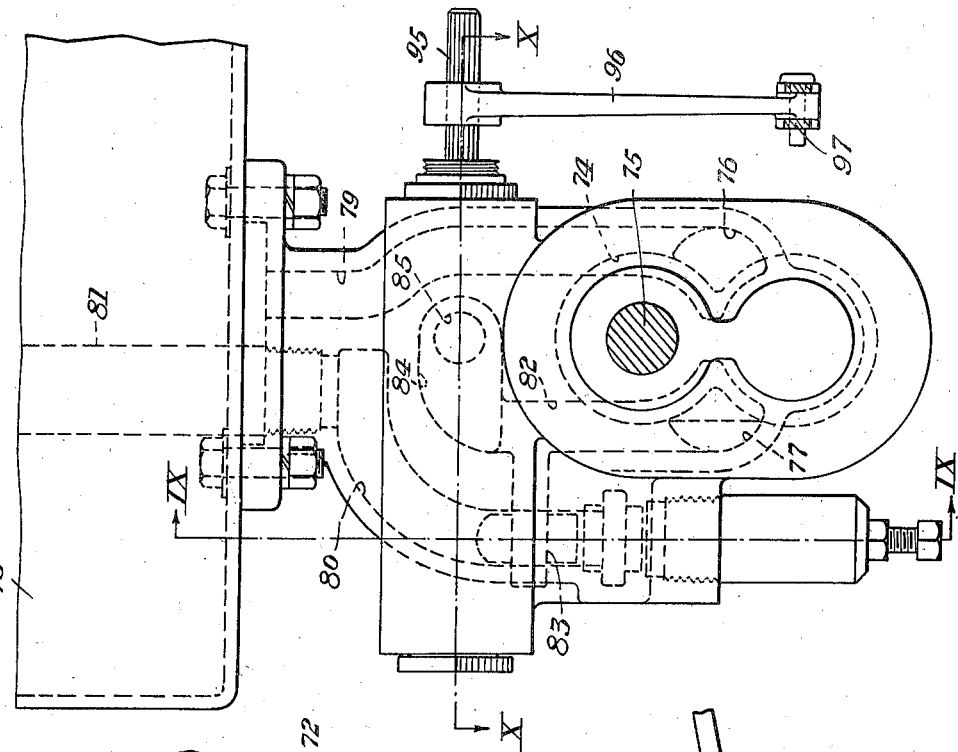
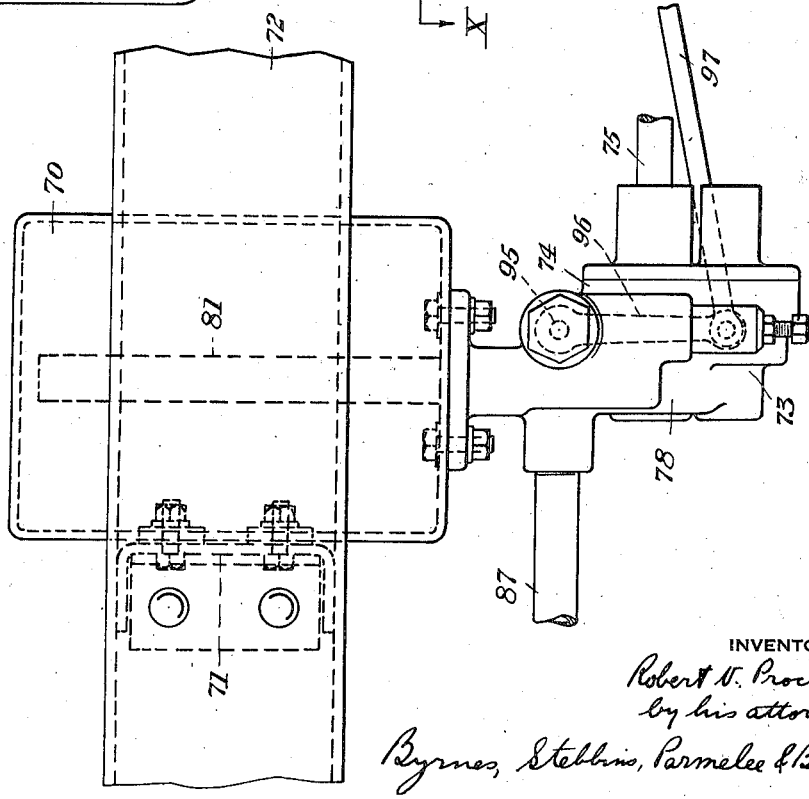
INVENTOR
Robert V. Proctor
by his attorneys
Byrnes, Stebbins, Parmelee & Blenko Sept. 28, 1937.  R. V. PROCTOR  2,094,466
HYDRAULIC SYSTEM FOR VEHICLES
Filed May 18, 1932   6 Sheets-Sheet 4

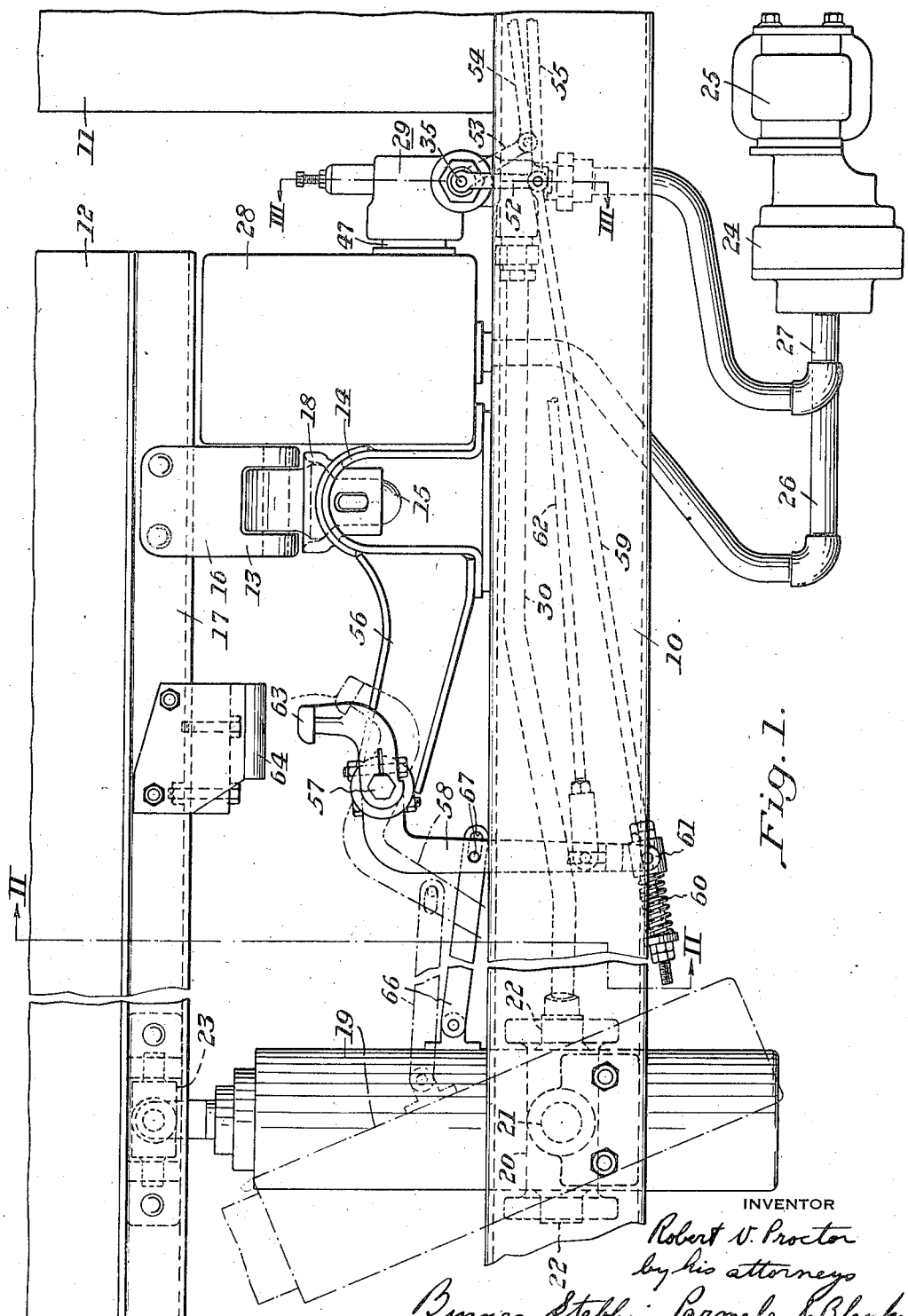

INVENTOR
Robert V. Proctor
by his attorneys
Byrnes, Stebbins, Parmelee & Blenko

Sept. 28, 1937.  R. V. PROCTOR  2,094,466
HYDRAULIC SYSTEM FOR VEHICLES
Filed May 18, 1932   6 Sheets-Sheet 5
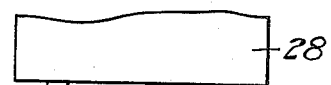
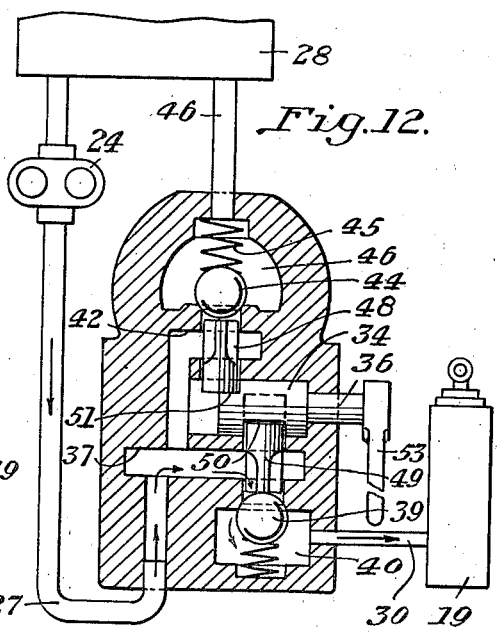
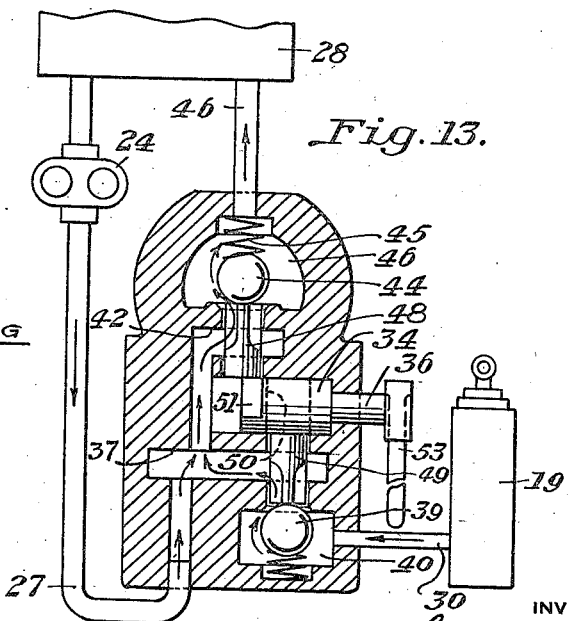
INVENTOR
Robert V. Proctor
by his attorneys
Stebbins Blenko & Parmelee Sept. 28, 1937.   R. V. PROCTOR   2,094,466
HYDRAULIC SYSTEM FOR VEHICLES
Filed May 18, 1932   6 Sheets-Sheet 6

INVENTOR
Robert V. Proctor
by his attorneys
Stebbins Blenko & Parmelee

Patented Sept. 28, 1937

2,094,466

UNITED STATES PATENT OFFICE 2,094,466

HYDRAULIC SYSTEM FOR VEHICLES

Robert V. Proctor, Youngstown, Ohio, assignor to The Commercial Shearing & Stamping Company, Youngstown, Ohio, a corporation of Ohio Application May 18, 1932, Serial No. 612,017

18 Claims. (Cl. 60—52)

My invention relates to vehicles having operating mechanisms thereon such as dump bodies and the like and, in particular, to a hydraulic system for a hoist or jack for operating said mechanisms. The invention will be described as applied to a tilting vehicle body of known construction, although it is in no wise limited to such use.

A typical dumping system for a tilting body mounted on a vehicle such as a motor truck, as at present constructed, comprises a fluid reservoir, an extensible jack for raising the body, a pump for circulating fluid from the tank to the jack, a valve for controlling the flow of fluid and directing it either to said jack or by-passing it around said pump, and a power take-off connectable with the truck motor for driving the pump.

In accordance with my invention, I mount a control valve for the system adjacent the fluid reservoir or tank. The pump is positioned therebelow to receive oil therefrom at low pressure and deliver it to the valve at high pressure. A high pressure line extends from the valve to the jack. The valve is of novel construction and operates to by-pass the fluid when the jack has been fully extended. The jack is normally held in extended position by a check valve which can be manually released to lower the body.

Automatic cut-off mechanism is incorporated by which the tilting of the body may be stopped at any desired angle whether for rear dumping or side dumping.

In a modified form of the invention, adapted especially for smaller installations, I provide a pump and valve within the same casting. The casting is supported directly below the fluid reservoir and operating connections from the valve extend to the operator's cab. The construction of the modified form of control valve is somewhat simpler but the fundamental principle is the same.

For a complete understanding of the invention, reference is made to the accompanying drawings illustrating a present preferred embodiment. In the drawings:

Figure 1 is a partial side elevation broken away in parts showing the invention applied to a dumping body mounted on a motor truck chassis;

Figure 2 is a partial sectional view taken along the line II—II of Figure 1 showing only the far side of the body as viewed in the latter;

Figure 3 is a sectional view through the control valve substantially along the plane of line III—III of Figure 1;

Figure 4 is a sectional view along the plane of line IV—IV of Figure 3;

Figure 5 is a sectional view along the plane of line V—V of Figure 3;

Figure 6 is a sectional view along the plane of line VI—VI of Figure 5;

Figure 7 is a partial side elevation of a modified form of fluid pump and control valve and the tank on which they are supported;

Figure 8 is an end view of the device shown in Figure 7, to enlarged scale, as would be seen by observing Figure 7 from the right-hand side, with parts in section;

Figure 11 is a diagrammatic view of the hydraulic system, the valve being shown in section, about as in Figure 3, certain of the structural features being altered for the purpose of facilitating illustration;

Figure 12 is a similar view of the system with the valve in the raising position; and Figure 13 is a similar view of the system with the valve in lowering position.

Figure 9:
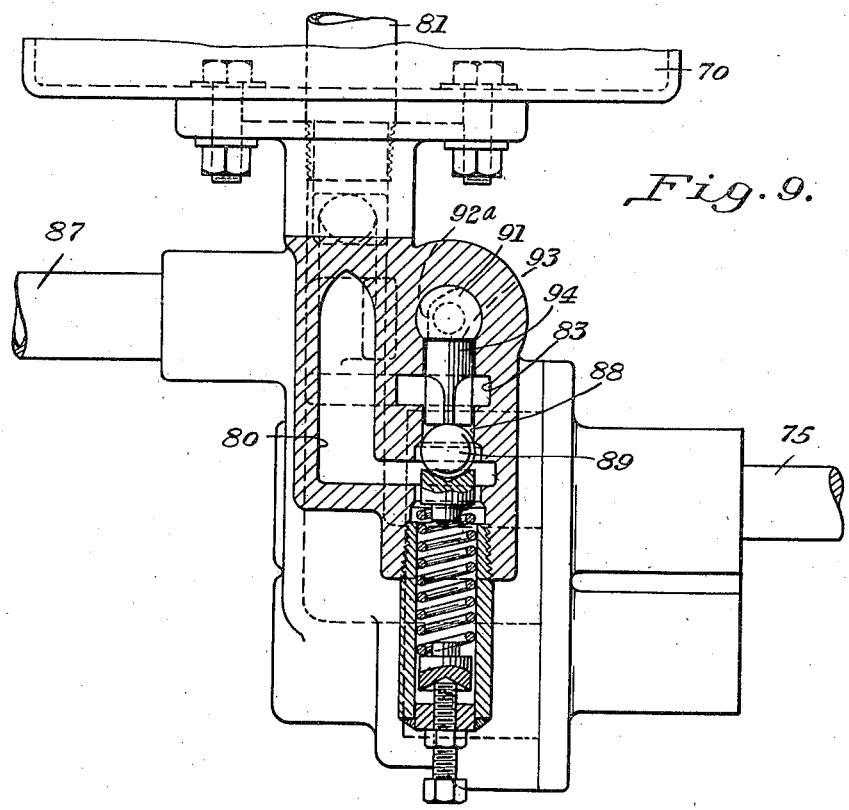
Figure 9 is a sectional view along the line IX—IX of Figure 8.

Referring now in detail to the drawings, and particularly to Figures 1 through 6, a vehicle, for example, a motor truck, has a chassis 10 and an operator's cab 11. A body 12 is mounted on the chassis and supported therefrom by four hinge joints such as that shown at 13. The hinge joints are located at the ends of front and rear transoms 14 and comprise a pin 15 hinged to a bracket 16 secured to the body frame 17 consisting of structural shapes, such as Z-bars. The pins 15 are received in cups 18 on the ends of the transoms 14.

The hinged joints for supporting the body on the chassis so as to render it capable of dumping to either side or to the rear, are described more fully and claimed in United States Patent No. 1,909,341.

A telescoping hydraulic jack 19 is supported on the chassis 10 by means of a yoke 20 trunnioned thereto on bearings 21. The jack is trunnioned in the yoke on bearings 22 so as to have universal movement with respect to the chassis. The piston of the jack 19 is similarly connected to the body 12 by a double trunnion fitting 23 mounted in the body frame 17, as described more fully in said patent.

For supplying fluid to operate the jack 19, a pump 24 is mounted so as to be driven by a power take-off 25 associated with the truck transmission. The pump is a gear pump of substantially standard construction and has ports connecting with inlet and discharge conduits 26 and 27. The pump is short and is connected directly to the power take-off so that excessive twisting moments tending to carry the take-off away from the housing are eliminated.

The inlet conduit 26 leading to the pump 24 is connected to a reservoir or storage tank 28. A control valve having a body 29 is mounted on the tank 28 and is connected to the discharge conduit 27 from the pump. A high pressure conduit 30 leads from the valve to a port in the wall of the jack 19, which is co-axial with one of the bearings 22 supporting the jack in the yoke 20 as described in the patent mentioned above.

The construction of the valve can best be explained by reference to Figures 3 through 6.

The valve body 29 comprises a casing 31 having an inlet port 27a in the bottom thereof into which the conduit 27 extends. A transverse bore 32 through the casing 31 provides seats for valve operating cams 33 and 34. Operating shafts 35 and 36, integral with the cams 33 and 34, extend outwardly of the casing and are provided with suitable packing glands.

From the inlet port 27a, a transverse passage 37 in the valve casing extends to a delivery port 38 controlled by a check valve 39. The port 38 connects the passage 37 to a passage 40 leading directly to a discharge or exhaust port 41 into which the conduit 30 extends.

A by-passing passage 42 branches from the passage 37, and extends around the cam 33 as shown in Figure 4, to a port 43 controlled by a relief valve 44. A spring 45 having adjusting means is provided for normally maintaining the valve 44 on its seat to close the port 43. The port 43 connects the passage 42 to a passage 46 leading from the valve casing directly to the tank 28 to which it is connected by means of a nipple 47.

Plungers 48 and 49 reciprocate in suitable guides on rotation of the cams 33 and 34 for operating the valves 39 and 44. The cam 34 has a recess 50 therein so that on counterclockwise movement thereof, the valve 39 is not at first opened. This provides for holding the jack extended, since the check valve 39 prevents emptying the jack cylinder. Such movement of the cam 34 does, however, operate the plunger 48 to open the valve 44 by raising the plunger from a recess 51 in the cam 34 in which it normally is seated. This by-passes the fluid delivered by the pump. Further rotation of the cam 34 will, of course, actuate the plunger 49 to open the valve 39 while maintaining the valve 44 open. This permits the jack to telescope. Rotation of the cam 33 in either direction will open the valve 44. This automatic operation shifts the valve to holding position.

Levers 52 and 53 are mounted on the shafts 35 and 36, respectively, for operating the valves 39 and 44. The shafts 35 and 36 are preferably milled to permit adjustment of the levers 52 and 53 to the desired operating positions thereon. The lever 53 is adapted to be controlled manually and a link 54 is pivoted to the end of the lever and extends to the cab 11 to an operating lever thereon. The lever 52 may also be provided with a link 55 pivoted thereon extending to a similar control lever in the cab. Means are also provided for operating the lever 52 in response to the elevation of the body 12 to the desired dumping angle. This means is best illustrated in Figures 1 and 2.

Brackets 56 extend rearwardly from the front transom 14 to provide a bearing for a hexagonal shaft 57. An arm 58 carried on the shaft 57 is connected to the lever 52 of the valve 29 by a link 59. A resilient connection between the arm 58 and the link 59 is afforded by a spring 60 and a yoke 61. The arm 58 is shifted on tilting of the body 12 to the desired angle in such direction as to operate the lever 52 to discontinue extension of the jack 19. A link 62 may be provided for operating the power take-off gear shift lever to discontinue operation of the pump simultaneously. The construction of the take-off and its gear shift are well known and therefore need not be described here.

The mechanism for automatically shifting the shaft 57 and the arm 58 comprises a crank 63 on the shaft 57, which is adapted to be engaged by a cam 64 bolted to the body frame 17. It will be understood that there is a crank 63 and a cam 64 at each side of the vehicle body. When the body 12 is tilted sideward about the axis of its hinge joints 13, the dumping axis being indicated at 65 in Figure 2, the cam 64 on the side toward which dumping is being effected swings down into engagement with the crank 63, as shown in dotted lines, shifts the crank to rotate the shaft 57 and swing the arm 58 thereon in a clockwise direction. This movement of the arm 58 opens the valve 44 to prevent further raising of the body, which is thereafter held in elevated position until operation of the valve 39.

A link 66 pivoted to the jack 19 and having a pin and slot connection 67 to the arm 58 is provided for actuating the arm to operate the valve 39 when the body has been raised to the proper rear dumping angle. Under such condition, the jack 19 will be tilted to the dotted line position of Figure 1 and the withdrawal of the link 66, after the lost motion provided by the pin and slot connection 67 has been taken up, will shift the arm 58 with the results mentioned. The connection of the link to the arm is loose enough to provide the lost motion necessary for lateral inclination of the link on side dumping.

In order to make clear the operation of the system of my invention, I shall now describe in detail a complete operating cycle. Under normal conditions, the body 12 is in horizontal position, the jack 19 is collapsed, the parts of the valve 29 are in the positions illustrated in Figure 11 of the drawings, the cam 34 being in position such as to open the valve 44, and the power take-off 25 being disengaged from the truck motor so that the pump 24 is stationary. If it is desired to tilt the body 12 about any particular axis, that is, on either side or to the rear of the body, the hinge joints 13 are appropriately locked, as described and claimed in the patent mentioned above, and the power take-off gear shift is operated to engage the truck transmission. The pump 24 is thereupon started. The pump intake 26 is connected directly to the tank 28 so that fresh fluid from the tank is immediately supplied to the pump. This fluid is discharged through the conduit 27 into the port 27a of the valve body 29. Since the valve 44 is open, the fluid is discharged from the valve body 29 through the passage 46 directly to the tank 28. Since the pump draws fresh oil continuously from the tank, there is no danger of overheating, even after long continued idling operation of the pump, because the oil returned to the tank is cooled before it returns to the pump and even though there may be some temperature rise in the tank, it will not be excessive.

When it is desired to tilt the body, the control lever in the cab is operated to shift the link 54. The lever 53 is thereby rotated to the position shown in Figure 12 so that the plunger 48 is released and the valve 44 is closed by the spring 45. The spring 45 is designed so that the valve 44 will remain closed unless abnormal pressure is applied thereto. The by-passing passage to the tank is thus closed and the fluid is forced to take the only other alternative path, which is through the valve 39. This valve is normally closed because of the shape of the recess 50 in the cam 34. The valve 39 is opened by the fluid pressure, its spring being smaller and weaker than that of the valve 44. The fluid traversing the port 38 is discharged through the passage 40 and the port 41 to the conduit 30 leading to the jack cylinder. The jack is thereby extended and the body raised for dumping. When the body has reached the desired limit of tilting, the shaft 57 is operated in the manner already explained, either by engagement of one of the cams 64 and crank 63 or by retraction of the link 66. As the arm 58 is swung clockwise through a small angle, the link 59 operates the lever 52 of the valve 29 to turn the shaft 35 and the cam 33 so that the plunger 48 is raised to open the valve 44. This movement reestablishes the by-passing passage for the fluid delivered by the pump. A low pressure by-pass to the reservoir is thus opened and continued operation of the pump does not consume any considerable amount of power, nor is the fluid friction sufficient to materially increase the temperature of the fluid. The hydraulic system, furthermore, is relieved from all high pressure strain. At the same time, the valve 39 reseats and holds the jack in extended position. If the automatic gear shift for the power take-off is employed, the movement of the arm 58 will disengage the take-off from the truck transmission through the linkage 62.

When it is desired to lower the body to horizontal position, the control lever in the operator's cab is operated so as to shift the link 54 and lever 53 again. The resulting rotation of the cam 34 to the position shown in Figure 13 opens the valve 39 by depressing the plunger 49. The cam 33 holds the valve 44 open until rotation of the cam 34 brings its surface into position to hold the valve open when the cam 33 is reset by lowering of the body. The fluid in the jack being released, the body descends and the fluid flows back through the valve port 38, the port 43, the passage 46 and the nipple 47 to the tank 28. Although the cam 33 is restored to the illustrated position on lowering of the body, the cam 34 holds the plunger 48 up and the valve 44 open. When the body has returned to horizontal position, the control lever in the cab may again be operated to close the valve 39 and re-open the valve 44. The above cycle is repeated for every operation.

Figure 10:
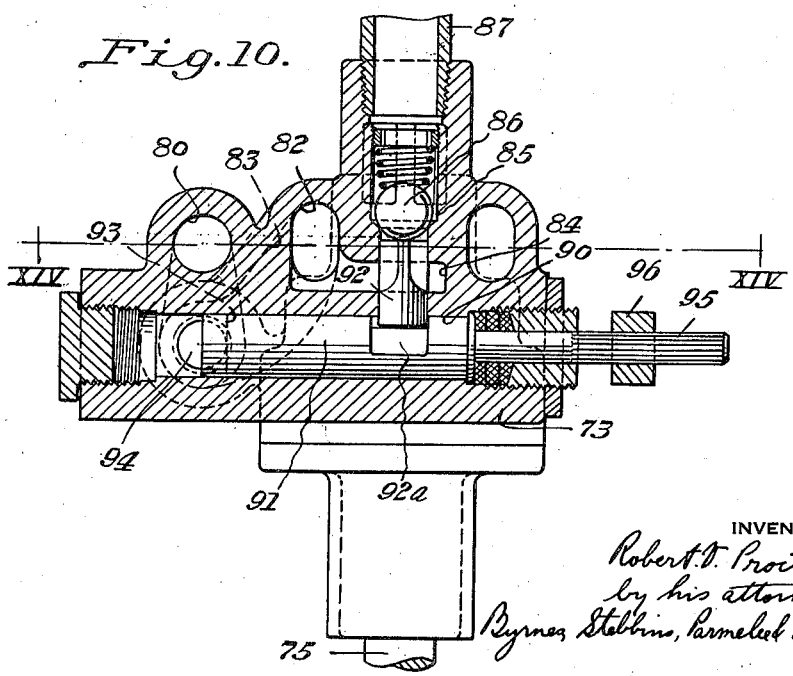
Figure 10 is a sectional view along the line X—X of Figure 8.
Figure 14:
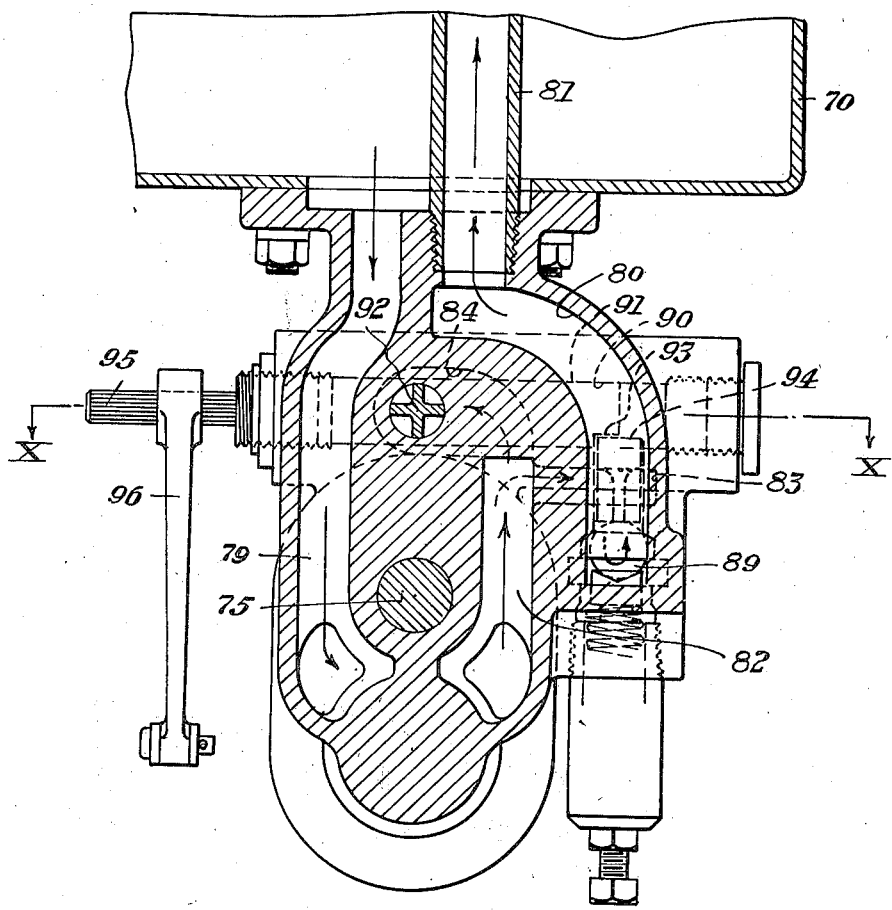
Figure 14 is a sectional view along the line XIV—XIV of Figure 10.

In a modified form of the invention illustrated in Figures 7 through 10, a reservoir 70 is secured by bolting ears to a cross member 71 extending between side channels 72 of a sub-frame for the tilting body. The side channels 72 rest on the chassis rails (not shown). A casting 73 attached to the bottom of the reservoir 70 incorporates both a pump and a control valve. The pump chamber is indicated at 74 and includes bearings for pump gears (not shown) adapted to be driven by a shaft 75 extending from a power take-off. The pump has an inlet port 76 and an outlet port 77.

A valve casing 78 is included in the casting 73 and has an inlet passage 79 opening into the reservoir and communicating with the port 76; and an outlet passage 80 leading to a baffle tube 81 extending vertically within the reservoir 70.

A passage 82 extends from the pump outlet port 77 to a transverse passage 83 and to a passage 84 opening into a discharge port 85. A ball check 86 normally closes the discharge port 85 but permits the flow of fluid through a conduit 87 leading to a hoist similar to that shown at 19 in Figure 1. The passage 83 terminates in a relief port 88 normally closed by a ball closure 89. When opened, the closure 89 permits the flow of fluid from the passage 83 into the outlet passage 80 and through the baffle tube 81.

A transverse bore 90 through the casting 73 is provided with a cam shaft 91 rotatable therein. A plunger 92 reciprocable in the casting 73 is adapted to be engaged by a cam surface 92a on the shaft 91 to open the check valve 86. The cam shaft 91 also has a cam surface 93 adapted to engage a plunger 94 to open the closure 89. The cam shaft 91 has a milled end 95 and an operating lever 96 thereon. A connecting link 97 extends from the end of the operating lever 96 to the operator's cab or other desired point of control.

With the cam shaft in the illustrated position, the check valve 86 and the relief valve 89 are closed. Since the cam surface 93 is flat, movement of the lever 96 in either direction will open the relief valve 89. The check valve 86 will be opened as soon as the shaft 91 is rotated in the clockwise direction from its illustrated position. If the cam shaft is turned in a counterclockwise direction, however, the curvature of the cam surface 92a will prevent opening of the valve 86 until the shaft has turned through a considerable angle.

The illustrated position of the valve shown in Figures 7 through 10 is the hoisting position. Fluid from the reservoir 70 enters the passage 79 at low pressure, traverses the pump, and enters the passage 82 under high pressure. From the passage 82, the high pressure fluid has two alternative paths. It can flow through the passage 83 and force open the relief valve 89, or it can flow through the passage 84 and force open the check valve 86. The spring backing up the relief valve 89 is considerably stronger than the spring backing up the check valve so that the latter opens first to permit the flow of fluid through the outlet port 85 and the conduit 87 to the hoist cylinder. The body is tilted as the hoist is extended. When the hoist is completely extended, the pressure on the fluid builds up further to a value such that the relief valve 88 operates.

The hoisting operation may be stopped at any desired point by shifting the lever 96 in the counterclockwise direction. As previously stated, this operation opens the relief valve 89 and establishes a low pressure path for the fluid back to the reservoir 70 through the passage 80 and the tube 81. The initial movement of the lever 96 in the counterclockwise direction, as previously explained, does not affect the check valve 88 which remains closed to hold the body in tilted position. After arresting upward movement of the hoist, if it is desired to lower the body, the lever 96 may be moved further in the counterclockwise direction. The relief valve 89 is maintained open and continued rotation of the shaft 91 opens the valve 86 as the cam surface 92a engages the plunger 92. The opening of the valve 86 releases the fluid trapped in the hoist cylinder and the weight of the body causes contraction of the hoist. The fluid from the hoist flows back through the port 85 into the passage 82 and thence through the relief port 88 to the discharge passage 80.

If it is not desired to hold the hoist in the extended position for any length of time, the lever 96 may be turned clockwise. Such operation immediately opens both the valves 86 and 89 to establish the lowering circuit already described. It will be noted that the modification of the invention shown in Figures 7 through 10 does not include a separate cam shaft and valve for relieving the pressure automatically when the body has been tilted to the desired angle. Such means might be incorporated, however, for example, the mechanism of Figure 1 might be connected to the lever 96 to reset the latter at the completion of a hoisting operation. In such case, the relief valve would be positively opened without the necessity of permitting the fluid pressure to build up sufficiently to perform this function. Instead of using a single cam shaft, separate cams could be employed as in the previously described form of the invention.

It will be apparent that the invention is characterized by numerous advantages over the prior art and that it overcomes the objections to present systems previously mentioned. Since the pump draws fluid directly from the tank and, when by-passing, discharges into the tank, a supply of cool fluid for the pump is always insured and overheating is prevented. The hydraulic system described makes it possible to shorten the pump and reduce its weight, eliminating the excessive twisting moment exerted thereby on the power take-off housing. Another important advantage is that all the apparatus, including valve and pump, is adapted for either right-hand or left-hand mounting depending upon the construction of the particular truck or other vehicle on which the apparatus is used. The valve construction is very simple yet highly effective and easily operated to perform the various control functions. The relief valve provides a safety feature in that if the automatic cut-off mechanism fails, the increasing pressure in the system will operate the relief valve. Even in this condition, the pump continues to draw fresh oil from the tank so that it is kept cool. The same result follows, as previously explained, when the power take-off is in gear but the pump is idling.

The automatic cut-off mechanism is simple and efficient so that the chance of failure to operate is reduced to a negligible minimum. The automatic cut-off is effective whether the body is dumped to the side or to the rear and is readily adjustable to meet all requirements. This arrangement makes it possible to use dumping bodies requiring different jack strokes for side and rear dumping. A long, narrow body thus is made just as feasible as a short, wide body, which has heretofore been necessary, as explained above.

The present system also facilitates spreading the load by driving the truck along while the body is partially elevated. The body may be held in any desired position and while so held, the operation of the pump will not raise the body since the fluid merely circulates through the by-passing passage. Slight increase in the body elevation may be obtained by momentarily operating the control lever to close the by-passing passage so that fluid is forced into the hoist jack without the necessity of throwing the power take-off in and out of gear as is necessary with present apparatus. The cut-off mechanism may be manually controlled by a lever in the cab as well as automatically by the body operated mechanism.

Although the description of the invention has been limited to its use in connection with dumping vehicle bodies, it is applicable also to a wide variety of mechanisms. In addition to its use in three-way dump bodies as described herein, the invention may also be employed for operating tilting bodies that dump to the rear of the vehicle only. In fact, it may be used practically in any case where a hydraulic motor is required to exert intermittent linear forces. The system may be readily adapted to perform functions other than the raising of a tilting body on a vehicle chassis.

The modified form of the invention herein described is particularly applicable to small-unit installations and its particular advantage is in that the pump and valve are incorporated in a single casting which is mounted directly on the fluid tank. The latter may be adjusted within limits to obtain proper alignment of the power take-off shaft with the pump drive.

Although I have illustrated and described but a single present preferred embodiment of the invention, it will be apparent that many changes in the construction described and illustrated may be made without departing from the spirit of the invention or the scope of the appended claims.

I claim:

1. A control valve comprising a casing having inlet, delivery and exhaust ports, a relief valve closing the exhaust port and a check valve closing the delivery port, means for operating said valves comprising a shaft mounted rotatably therebetween in the casing, said shaft having slots forming cam surfaces, and plungers actuable thereby on rotation of the shaft to operate said valves.

2. In a valve, a casing, a member rotatable in said casing and having a plurality of cam faces thereon, an inlet port extending thereinto, a relief valve in said casing operable by one of said cam faces, a check valve in said casing operable by rotation of another of said faces, and a second member rotatable in said casing having a cam face effective to operate said relief valve.

3. A control valve mechanism comprising a casing, an inlet port extending thereinto, exhaust and delivery ports in said casing, a relief valve normally closing said exhaust port, a check valve normally closing said delivery port, a member with a plurality of cam faces rotatable in said casing, one of said faces being effective on rotation for opening said relief valve, another of said faces being effective on rotation for opening said check valve, and a second member rotatable in said casing having a cam face effective to operate said relief valve.

4. A control valve mechanism therefor having an inlet port, an exhaust port, and a delivery port, a relief valve for closing said exhaust port a check valve for closing said delivery port, a cam member rotatable in said mechanism, said member having a face for opening said relief valve, and a face effective on rotation to open said check valve, and a second cam member rotatable in said mechanism having a face effective to operate said relief valve.

5. A control valve mechanism including a casing, an inlet port extending thereinto, exhaust and delivery ports extending therefrom, a pressure operated relief valve for closing the exhaust port and a check valve for closing the delivery port, means in said casing for normally opening said relief valve to permit continuous circulation of fluid through the mechanism, and other means operable to open said relief valve and said check valve simultaneously.

6. A hydraulic control valve comprising a casing, inlet, exhaust and delivery ports therein, a pressure operated relief valve closing the exhaust port, a check valve closing the delivery port, and a cam and plungers for operating said relief and check valves, said cam being effective in successive angular positions for opening said relief valve, permitting the closure of both valves, and opening both valves.

7. A hydraulic control valve comprising a casing, inlet, exhaust and delivery ports, a relief valve for closing said exhaust port, a check valve closing said delivery port, a cam and plungers, said cam having faces for opening said relief valve in one position of the cam, permitting closure of both valves in adjacent position, and opening both said valves in a further position of said cam.

8. A hydraulic valve comprising a casing, spring closed discharge and relief valves therein, a cam shaft rotatable in said casing, and surfaces on said cam shaft for opening both said valves, one of said surfaces being effective to open the relief valve on initial movement of the shaft in either direction, another of said surfaces being effective to open the discharge valve on initial movement of the shaft in only one direction.

9. A control valve comprising a casing, delivery and exhaust ports on opposite sides thereof, a cam shaft extending into the casing between said ports, valves closing said ports, plungers operable by said cam shafts for actuating said valves, a second cam shaft coaxial with the first so positioned in the casing as to actuate one of the plungers.

10. A valve mechanism for controlling fluid under pressure, comprising a body, inlet, exhaust and delivery ports therein, a pressure-operated relief valve closing the exhaust port, a check valve closing said delivery port, plungers for operating said relief and check valves, a cam having a face for operating the relief-valve plunger and a face for operating the check-valve plunger, and a second cam having a face for operating the relief valve.

11. A control valve for a hydraulic system including also a reservoir, a pump and a jack, said valve comprising a casing, an inlet port adjacent the bottom of the casing, means connecting the inlet port to the pump, relief and discharge ports adjacent the top and bottom of the casing respectively, means connecting the relief port to the reservoir, means connecting the discharge port to the jack, a passage in the casing connecting the inlet and relief ports, a passage branching from the first passage and extending to the discharge port, and spring closed valves in both said passages adapted to open under the pressure of the fluid delivered thereto.

12. The apparatus of claim 11 characterized by means adjacent the central portion of the casing for mechanically operating the valve in the passage connected to the relief port.

13. The apparatus of claim 11 characterized by means adjacent the central portion of the casing for mechanically operating the valve in the passage connected to the relief port, and the valve in the discharge port passage sequentially.

14. The apparatus of claim 11 characterized by means adjacent the central portion of the casing for mechanically operating the valve in the passage connected to the relief port, and the valve in the discharge port passage simultaneously.

15. A valve for controlling a hydraulic system including also a reservoir and a jack, said valve comprising a casing, said casing having a cavity, pump impellers journaled therein, a passage extending from the inlet side of said cavity through the wall of the casing and connecting the cavity with said reservoir, a discharge port in the casing, means connecting the discharge port to said jack, a passage connecting the outlet side of said cavity to said port, a valve controlling said port, means for operating the valve, a passage branching from the last-mentioned passage, extending through the wall of the casing and communicating with said reservoir, a relief valve in said branching passage, and means for mechanically actuating said relief valve.

16. A valve for controlling a hydraulic system including also a reservoir and a jack, said valve comprising a casing, said casing having a cavity, pump impellers journaled therein, a passage extending from the inlet side of said cavity through the wall of the casing and connecting the cavity with said reservoir, a discharge port in the casing, means connecting the discharge port to said jack, a passage connecting the outlet side of said cavity to said port, a valve controlling said port, means for operating the valve, a passage branching from the last-mentioned passage, extending through the wall of the casing and communicating with said reservoir, a relief valve in said branching passage, said first-mentioned valve being a check valve normally operative to prevent the return of fluid from the jack, and means for mechanically unseating said check valve to permit draining of fluid from the jack.

17. A valve for controlling a hydraulic system including also a reservoir and a jack, said valve comprising a casing, said casing having a cavity, pump impellers journaled therein, a passage extending from the inlet side of said cavity through the wall of the casing and connecting the cavity with said reservoir, a discharge port in the casing, means connecting the discharge port to said jack, a passage connecting the outlet side of said cavity to said port, a valve controlling said port, means for operating the valve, a passage branching from the last-mentioned passage, extending through the wall of the casing and communicating with said reservoir, a relief valve in said branching passage, and common means for opening said valves.

18. A control valve comprising a casing having inlet, delivery and exhaust ports, valves closing the two latter ports, a bore extending transversely therebetween, a shaft mounted for rotation in the bore, said shafts being slotted to form cam surfaces thereon, and plungers engaged by said cam surfaces for operating said valves, at least one of the slots in the shaft being straight whereby to actuate the cooperating plunger on rotation of the shaft in either direction, the other slot being curved whereby to actuate the other plunger on initial movement of the shaft in only one direction.

ROBERT V. PROCTOR.